3,598,605
FOOD FOR FUR-BEARING PREDATORY ANIMALS
Claus Lutherus van Limborgh, Baarn, Netherlands, assignor to Stichting voor Wetenschappelijk Onderzoek op Diervoedergebied, Putten, Netherlands
No Drawing. Filed Mar. 10, 1967, Ser. No. 622,051
Claims priority, application Netherlands, Mar. 18, 1966, 6603625; Feb. 27, 1967, 6703019
Int. Cl. A23k *1/00, 1/10*
U.S. Cl. 99—2
3 Claims

ABSTRACT OF THE DISCLOSURE

A dry food for Mustelidae, such as mink, and other predatory animals, containing all required nutrients is mixed with water before consumption. The consistency of the watered food is such that the animals are prevented from soiling their pelts. Molten fat is mixed with the other ingredients, and the mixture is allowed to congeal into a hard mass, which is then broken up into a granulate.

BACKGROUND OF THE INVENTION

(1) Field of the invention

The invention relates to a process for preparing a food for Mustelidae, such as mink, and other predatory animals, and to the food obtained by this process.

(2) Description of the prior art

It is the object of the invention to provide a dry food for fur-bearing predatory animals which contains all the components required for complete nutrition, so that it may replace, either partially or completely, the usual food consisting of butcher's offal, fish and the like. Until now, attempts to prepare such a food have been unsuccessful. After mixing with water the food must have such a consistency that it may be readily consumed by the animals without any digestive difficulties, and that it is at the same time sufficiently solid to prevent the animals from soiling their pelts. The danger of soiling occurs as soon as the liquidity of the watered food is even slightly excessive; due to the generally rather sticky nature of the food, the pelts are rendered worthless in this case by numerous, practically irremovable food stains. In order to avoid soiling, the watered food should have such a consistency that it may be placed on the wire netting of the animal cages without falling through.

For this purpose, it is necessary that the food be able to take up a sufficient amount of water, since a too dry food in the nature of meal, crumbs or gains is difficult for the animals to eat, so that it is messed about. As a consequence, such a food is an immediate cause of disturbance of the growth, the pelt formation, the propagation and other physiological functions, and frequently leads to considerable mortality. It is known, in practice, that fur-bearing predatory animals are very sensitive to the correct food having the right taste and consistency.

In addition, the food should be highly concentrated and have a high fat content. Since the existence of a high fat content is contradictory to the requirement that the food must be able to take up a sufficient amount of water, prior attempts have not led to satisfactory results.

I have found that a food for Mustelidae and other small predatory animals, which may be immediately consumed by the animals without any objections after being mixed with water, may be obtained by a suitable composition and manner of preparation of the dry food.

SUMMARY

According to the invention, at least 15% of molten fat containing an emulsifier is mixed with a plurality of other air dry components comprising at most 30% of water soluble substances and at least 15% of decomposed starchy substances which are able to swell with water, and the mixture is allowed to congeal into a hard mass, after which the mass is broken up into a granulate having a loose crumb-like structure comprising at least 15% of crude fat, at least 25% of crude proteins, at most 10% of ash and at most 12.5% of moisture, all percentages being by weight and based on the total weight of the air dry product.

In a preferred embodiment of the invention, the mixture consists of 30–65% of animal proteinous substances having more than 60% of crude proteins, 4–15% of vegetable proteinous substances having more than 40% of crude proteins, 15–35% of decomposed starchy substances, 1–5% of a premixture of minerals, vitamins and similar additives, and 15–25% of fat, including the emulsifier, all percentages being by weight and based on the total weight of the air dry product.

The food obtained in this manner may take up an amount of water at least equal to 50% of its weight without dissolving in the water. The watered food has a tough, dough-like consistency and may be placed on the cages within reach of the animals without dripping through, so that the animals cannot immediately contact the food with their pelts. The air dry food may be stored for at least three months without any loss of quality, so that no special installations, such as cooling apparatus and the like, need be provided at the farm for this purpose. When the watered food is supplied to minks, the growth, propagation and other physiological functions remain normal, so that satisfactory pelt formation is obtained. The watered food is readily accepted by the minks.

The air dry food is obtained by mixing the liquid fat, to which one or more emulsifiers have been added, with the other ingredients, which may or may not have been previously ground and/or mixed. The resulting mixture is homogenized and cooled into a rigid hard mass. This hard mass is broken up into a granulate having a loose crumb-like structure, which may readily take up an amount of water at least equal to 50% of its weight, or even more, without losing its tough, doughlike consistency.

DESCRIPTION OF THE PREFERRED EMBODIMENTS

Example I

After grinding, if necessary, the following substances were mixed in a suitable mixer.

Animal proteinous substances: 5 lbs. of blood meal; 20 lbs. of meat meal: 20 lbs. of skimmed milk powder
Vegetable proteinous substance: 10 lbs. of dried yeast
Decomposed starchy substance: 15 lbs. of cooked and dried pure starch
Other additions, except fat: 3.5 lbs. of a premixture of vitamins, minerals and other micronutrients on flour.

25 lbs. of stabilized lard, mixed with 1.5 lbs. of lecithin as an emulsifier, were melted and homogenized with the above-mentioned mixture to obtain a mass having a total weight of 100 lbs. The obtained hot, soft mixture was stored in a porous packing until the fat was completely congealed into a hard mass consisting of a few lumps. The hard mass was ground in a beaker, and crumbled into granules having a maximum diameter of 0.4", after which the granulate was packed in moisture-tight sacks. If desired, the congealing of the fat may be accelerated by artificial cooling; in which case the cooling operation can be combined with the crumbling.

The granulate was able to take up an amount of water equal to at least 50% of its weight. The watered food had a tough, dough-like consistency and was readily consumed by the minks. In the moisture-tight packing, the granulate could be stored for at least three months.

EXAMPLE II

After grinding, if necessary, the following substances were mixed in a suitable mixer.

Animal proteinous substances: 26 lbs. of dried eggs without shell; 29 lbs. of fish meal; 9 lbs. of skimmed milk powder Vegetable proteinous substance: 4 lbs. of dried yeast Decomposed starchy substance: 15 lbs. of cooked and dried pure starch Other additions, except fat: 1 lb. of the premixture of Example I.

15 lbs. of lard, mixed with 1 lb. of lecithin, were homogenized with the above-mentioned mixture, and the obtained mass was treated as in Example I. The final granulate could be stored in a moisture-tight packing for at least three months, and took up an amount of water at least equal to 50% of its own weight to form a food with a tough, dough-like consistency.

EXAMPLE III

After grinding, if necessary, the following substances were mixed in a suitable mixer.

Animal proteinous substances: 3 lbs. of blood meal; 13 lbs. of meat meal; 13 lbs. of casein Vegetable proteinous substance: 15 lbs. of dried yeast Decomposed starchy substance: 25 lbs. of cooked and dried pure starch Other additions, except fat: 4.5 lbs. of the premixture of Example I.

25 lbs. of lard, mixed with 1.5 lbs. of glycerol monoester as an emulsifier, were homogenized with the above-mentioned mixture, and the obtained mass was treated as in Example I. The final granulate could be stored for at least three months in a moisture-tight packing, and took up an amount of water at least equal to 50% of its own weight, to form a food with a tough, dough-like consistency.

EXAMPLE IV

After grinding, if necessary, the following substances were mixed in a suitable mixer.

Animal proteinous substances: 20 lbs. of fish meal; 20 lbs. of dried eggs without shell; 5 lbs. of casein Vegetable proteinous substance: 10 lbs. of toasted soya scrap Decomposed starchy substance: 25 lbs. of cooked and dried rice Other additions, except fat: 4 lbs. of the premixture of Example I.

15 lbs. of lard, comprising 1 lb. of glycerol monoester as an emulsifier, were homogenized with the above-mentioned mixture, and the obtained mass was treated as in Example I. The final granulate could be stored in a moisture-tight packing for at least three months, and took up an amount of water at least equal to 50% of its own weight to form a food with a tough, dough-like consistency.

EXAMPLE V

Propagation tests were made in various countries with a large number of minks, including Standards, Pearls, Sapphires, and Pastels. In these tests, 48 animals were fed for 100% with the watered food according to the invention, 49 animals were fed for 50–80% with the watered food according to the invention and for the remainder with so-called "farm food," and 1077 animals served as controls and were exclusively fed with "farm food." Farm food is a mixture prepared by the user and comprising 40% of fish and fish offal, 25% of chicken offal, mainly heads, 10% of liver, 15% of tripe and 10% of a substance available under the trade name "Pelsivit II." The following propagation results were obtained:

| | Test groups | | | Controls, farm food |
|---|---|---|---|---|
| | 50-80% invention | 100% invention | Total | |
| Number of tested females | 49 | 48 | 97 | 1,077 |
| Percent pregnant | 95.7 | 87.5 | 86.6 | 84.1 |
| Living cubs per tested female | 3.86 | 4.15 | 4.00 | 4.00 |
| Living cubs per pregnant female | 4.50 | 4.75 | 4.62 | 4.76 |

It appears from the table that the food according to the invention has no deleterious influence on the propagation of the minks, so that it may replace the usual farm food for any desired percentage, as far as propagation is concerned.

Furthermore, some animals were switched over from a nutrition with farm food to a nutrition with 100% of the watered food according to the invention at a time which was generally considered as unfavorable by the breeders. Five Sapphires and six Pearls were switched over in this manner at about six weeks before the mating period, and twenty Pearls were switched over immediately after mating. The following results were obtained:

| | | Switch-over 6 weeks | | | Switch-over after mating, Pearls |
|---|---|---|---|---|---|
| | Controls | Sapphire | Pearls | Total | |
| Number of females | 1,077 | 5 | 6 | 11 | 19 |
| Percent pregnant | 84.1 | 80.0 | 83.3 | 82.0 | 84.2 |
| Litter per tested female | | 3.8 | 3.7 | 3.7 | 4.4 |
| Litter per pregnant female | | 4.7 | 4.4 | 4.6 | 5.2 |
| Mortality, percent | | 21.1 | 9.1 | 14.6 | 6.0 |
| Living cubs per tested female | 4.0 | 3.0 | 3.3 | 3.2 | 4.1 |
| Living cubs per pregnant female | 3.7 | 4.0 | 3.9 | 3.9 | 4.76 |

It appears from this table that the food according to the invention may replace the farm food completely, and that the switchover even at an unfavorable time has no harmful consequences on the propagation. Other physiological functions connected with the propagation, such as heat, mating, conception, pregnancy, birth and lactation, were not influenced either.

EXAMPLE VI

Tests were made to establish the influence of the food according to the invention on pelt formation. For this purpose the quality of the pelt was compared with a standard quality corresponding with the genetic aptitude of the animals, since an animal cannot produce a better pelt than corresponds with its hereditary aptitude, but may of course produce a worse one under unfavorable circumstances.

The quality of a pelt cannot be exactly defined, since it depends on many factors. In the present tests, the animals were judged by an independent expert who gave appraisal figures from 1 to 5 for size, underwool, guard hair (i.e. smooth upper hair, in contradiction to the curly underwool), and color. It is pointed out in this connection that the weight of the animals does not correlate very well with the size of the pelt, and is subject to substantial fluctuations during the pelting period, since it is mainly dependent on the condition of the animals. For this reason, the weight has not been included in the following table of appraisal figures.

|  | Size | | Underwool | | Guard hair | | Colour | |
|---|---|---|---|---|---|---|---|---|
|  | Males | Female | Males | Female | Males | Female | Males | Female |
| Series A: | | | | | | | | |
| 100% farm food | 3.85 | 3.60 | 3.60 | 3.52 | 3.60 | 3.35 | 3.50 | 3.47 |
| 50% invention | 3.90 | 3.55 | 3.55 | 3.45 | 3.52 | 3.40 | 3.40 | 3.05 |
| 100% invention | 3.67 | 3.50 | 3.47 | 3.53 | 3.60 | 3.28 | 3.52 | 3.44 |
| Series B: | | | | | | | | |
| 100% farm food |  | 3.56 |  | 2.94 |  | 3.17 |  |  |
| 75% invention |  | 3.61 |  | 3.44 |  | 3.22 |  |  |
| 100% invention |  | 3.78 |  | 3.28 |  | 3.61 |  |  |
| Series C: | | | | | | | | |
| 100% farm food | 3.83 | 3.60 | 3.66 | 3.30 | 3.78 | 3.15 |  |  |
| 80% invention 1st generation | 3.66 | 3.60 | 3.41 | 3.32 | 3.75 | 2.62 |  |  |
| 80% invention 2d generation | 3.80 | 3.65 | 3.65 | 3.38 | 3.46 | 3.00 |  |  |

It appears from the average appraisal figures that the use of the food according to the invention does not have any harmful influence on the pelt quality. On the contrary, the pelt quality obtained with the food according to the invention is fully equivalent to that obtained with the usual farm food.

The conclusion is, therefore, that the food according to the invention meets all requirements with respect to the physiological functions of the minks and the interests of the breeder.

What is claimed is:

1. A process for preparing a food for fur-bearing predatory animals, comprising the steps of mixing at least 15% of molten fat containing an emulsifier with a plurality of other air dry components comprising up to 30% of water soluble substances and at least 15% of decomposed starchy substances able to swell with water, allowing the mixture to congeal by artificial cooling, whereby a hard mass is formed, and breaking up said mass into a granulate having a loose crumb-like structure, the said other components being selected in such a manner that the granulate comprises at least 15% of crude fat, at least 25% of crude proteins, up to 5% of crude cellulose, up to 32.5% of other carbohydrates, up to 10% of ash and up to 12.5% of moisture, all percentages being by weight and based on the total weight of the granulate.

2. A process as claimed in claim 1, wherein said mixture is constituted by 30–65% of animal proteinous substances having more than 60% of crude proteins, 4–15% of vegetable proteinous substances having more than 40% of crude proteins, 15–35% of decomposed starchy substances, 1–5% of a premixture of minerals, vitamins and other micronutrients and 15–25% of fat, including the emulsifier.

3. A process as claimed in claim 1 wherein the cooling is combined with the crumbling.

References Cited

UNITED STATES PATENTS

| | | | |
|---|---|---|---|
| 2,965,488 | 12/1960 | Belasco | 99—2 |
| 3,035,920 | 5/1962 | Knodt | 99—2 |
| 3,115,409 | 12/1963 | Hallinan et la. | 99—2 |
| 3,119,691 | 1/1964 | Lodington et al. | 99—2 |
| 3,246,989 | 5/1966 | Biehl | 99—2 |
| 3,284,211 | 11/1966 | Williams | 99—2 |
| 3,365,297 | 1/1968 | Burgess et al. | 99—2 |
| 3,420,672 | 1/1969 | Appleman | 99—2 |
| 3,438,780 | 4/1969 | Singer | 99—2 |
| 3,185,574 | 5/1965 | Gabby | 99—14 |

NORMAN YUDKOFF, Primary Examiner

C. P. RIBANDO, Assistant Examiner

U.S. Cl. X.R.

99—14, 2F